United States Patent
Loccufier et al.

(10) Patent No.: US 12,552,953 B2
(45) Date of Patent: *Feb. 17, 2026

(54) CATIONIC POLYMER NANOPARTICLES

(71) Applicant: AGFA NV, Mortsel (BE)

(72) Inventors: Johan Loccufier, Mortsel (BE); Luc Decoster, Mortsel (BE)

(73) Assignee: Agfa NV, Mortsel (BE)

( * ) Notice: Subject to any disclaimer, the term of this patent is extended or adjusted under 35 U.S.C. 154(b) by 610 days.

This patent is subject to a terminal disclaimer.

(21) Appl. No.: 17/922,820

(22) PCT Filed: Apr. 26, 2021

(86) PCT No.: PCT/EP2021/060790
§ 371 (c)(1),
(2) Date: Nov. 2, 2022

(87) PCT Pub. No.: WO2021/224041
PCT Pub. Date: Nov. 11, 2021

(65) Prior Publication Data
US 2023/0174810 A1 Jun. 8, 2023

(30) Foreign Application Priority Data
May 5, 2020 (EP) .................................. 20172947

(51) Int. Cl.
| | | |
|---|---|---|
| C09D 11/40 | (2014.01) | |
| B41J 11/00 | (2006.01) | |
| C08F 226/02 | (2006.01) | |
| C09D 11/023 | (2014.01) | |
| C09D 11/033 | (2014.01) | |
| C09D 11/037 | (2014.01) | |
| C09D 11/102 | (2014.01) | |
| C09D 11/106 | (2014.01) | |
| C09D 11/107 | (2014.01) | |
| C09D 11/322 | (2014.01) | |
| C09D 11/38 | (2014.01) | |
| C09D 11/54 | (2014.01) | |

(52) U.S. Cl.
CPC ............ *C09D 11/40* (2013.01); *B41J 11/002* (2013.01); *C08F 226/02* (2013.01); *C09D 11/023* (2013.01); *C09D 11/033* (2013.01); *C09D 11/037* (2013.01); *C09D 11/102* (2013.01); *C09D 11/106* (2013.01); *C09D 11/107* (2013.01); *C09D 11/322* (2013.01); *C09D 11/38* (2013.01); *C09D 11/54* (2013.01); *C08F 2810/20* (2013.01)

(58) Field of Classification Search
CPC ..... C09D 11/40; C09D 11/023; C09D 11/033; C09D 11/037; C09D 11/102; C09D 11/322; C09D 11/38; C09D 11/54; C09D 11/107; C09D 11/106; C08F 226/02; C08F 2810/20; B41J 11/002
See application file for complete search history.

(56) References Cited

U.S. PATENT DOCUMENTS

| | | |
|---|---|---|
| 2002/0077385 A1 | 6/2002 | Miyabayashi |
| 2019/0249024 A1 | 8/2019 | Shinohara et al. |

FOREIGN PATENT DOCUMENTS

| | | |
|---|---|---|
| EP | 1041126 A1 | 10/2000 |
| EP | 1125760 A1 | 8/2001 |
| EP | 2431431 A1 | 3/2012 |
| JP | 2016-204525 A | 12/2016 |
| JP | 2019-137760 A | 8/2019 |

OTHER PUBLICATIONS

U.S. Appl. No. 17/922,625, filed Nov. 1, 2022.
U.S. Appl. No. 17/922,628, filed Nov. 1, 2022.
U.S. Appl. No. 17/922,818, filed Nov. 2, 2022.
U.S. Appl. No. 17/923,024, filed Nov. 3, 2022.
European Patent Office, International Search Report in International Patent Application No. PCT/EP2021/060790, mailed Jul. 1, 2021, 3 pp.
European Patent Office, Written Opinion in International Patent Application No. PCT/EP2021/060790, mailed Jul. 1, 2021, 5 pp.
Ho et al., "Facile Route to Enzyme Immobilization: Core-Shell Nanoenzyme Particles Consisting of Well-Defined Poly(methyl methacrylate) Cores and Cellulase Shells," *Langmuir*, 24: 11036-11042 (2008).
Ho et al., "Mechanistic study of the formation of amphiphilic core-shell particles by grafting methyl methacrylate from polyethylenimine through emulsion polymerization," *Polymer*, 51: 3512-3519 (2010).
Li et al., "Synthesis of Well-Defined Amphiphilic Core-Shell Particles Containing Amine-Rich Shells," *Macromol. Rapid Commun.*, 28: 2267-2271 (2007).
Ramos et al., "Cationic Polymer Nanoparticles and Nanogels: From Synthesis to Biotechnological Applications," *Chem. Rev.*, 114: 367-428 (2014).

*Primary Examiner* — Patrick D Niland
(74) *Attorney, Agent, or Firm* — Leydig, Voit & Mayer, Ltd.

(57) ABSTRACT

A cationic polymer nanoparticle, functionalized with primary amines, characterized in that said nanoparticle comprises a resin having at least a) a repeating unit selected from the group consisting of an allyl amine and a vinyl amine, b) an oxalyl amide crosslinking unit and c) a repeating unit according to general formula (I) and/or general formula (II); the particle can be dispersed in an aqueous vehicle to be used in inkjet printing.

20 Claims, No Drawings ated in the core. To maximize the reactivity, it would be advantageous to design a fully functionalized nanoparticle.

CATIONIC POLYMER NANOPARTICLES

CROSS-REFERENCE TO RELATED APPLICATIONS

This patent application is the U.S. national phase of copending International Patent Application No. PCT/EP2021/060790, filed Apr. 26, 2021, which claims the benefit of European Patent Application No. 20172947.2, filed May 5, 2020.

TECHNICAL FIELD

The present invention relates to cationic polymer nanoparticles with high primary amine functionality. The particles are useful in 2-compound (2K) thermoset applications and in inkjet printing applications.

BACKGROUND ART

Primary amine functionalized polymers have a broad scope of reactivity, making them particularly useful as reactive partner in the design of 2K-thermoset composition e.g. in combination with epoxy based resins, β-keto-ester based resins and polymers functionalized with activated double bonds such as oligofunctional maleimides and acrylates.

Ink jet technology is evolving from an imaging technology into an industrial production methodology for digital manufacturing in different fields of technology such as decorative applications in flooring and furniture, electronics, textile printing, leather printing and glass printing, with an increasing interest in water based ink technology to replace UV technologies. Often the printed functionalities have to withstand harsh conditions, such as chemical and mechanical impact, making aqueous 2K-thermoset compositions an excellent conceptual option, if the classical technology can be translated into a digital technology wherein the printing liquids can be jetted by means of ink jetting technology. However, water soluble primary amine functionalized polymers have a considerable impact on the ink rheology and the viscoelastic properties of the ink making them less suitable for high speed ink jet printing. This problem can be solved by the design of highly primary amine functionalized cationic polymeric nanoparticles.

Primary amine functionalized cationic polymer nanoparticles have been mainly developed for biomedical and biological applications as part of more general technologies for the design of cationic polymer nanoparticles, where primary amines allow functionalization of the nanoparticles with biologically active molecules. Synthetic approaches and biotechnological applications have been reviewed by Ramos et al. (Chemical Reviews, 114(1), 367-428 (2014)), including emulsion polymerization, surfactant free emulsion polymerization, seeded emulsion polymerization and micro- and mini-emulsion polymerization. Using these technologies, only a limited number of primary amines can be introduced into the nanoparticles.

Another approach has been disclosed by Li et al. (Macromol. Rapid Commun., 28, 2267-2271(2007); Langmuir, 24, 11036-11042 (2008); Polymer, 51, 3512-3519 (2010)). Primary amine functionalized polymeric nanoparticles are prepared by grafting hydrophobic polymeric chains on primary amine functionalized polymers such as poly(allylamine) and poly(vinyl amine). This leads to core-shell particles, having primary amines in the shell but being unfunctionalized in the core. To maximize the reactivity, it would be advantageous to design a fully functionalized nanoparticle.

Now, a new nanoparticle design has been developed with a very high reactivity in 2K-thermoset compositions.

One of the most popular crosslinking agents are polyfunctional primary or secondary amines because they react easily with resins such as epoxy based resins. Preferably, the polyfunctional amine is kept apart from the resin with which it should react upon image formation to avoid interaction imparting the shelf-life of the resin containing aqueous inkjet ink. This can be achieved by including the polyfunctional amine in a reactant liquid such as a primer, to be under-coated or under-printed with respect to the resin containing inkjet ink or in an over print varnish, to be over-printed or over-coated with respect to the resin containing inkjet ink.

It has advantages if the reactant liquids such as primers or over-print varnishes can be applied image wise (=printing) the same way as the aqueous inkjet ink on a recording medium over non-image wise application onto the recording medium. The advantages are: a reduced amount of liquid coverage leading to a cost reduction and a faster drying of the printed images. Another advantage of the under-printing of a primer is that the primer does not need to be as resistance to mechanical impact (scratch, abrasion, . . . ) or chemicals (water, solvents) as the ink forming the image and which is jetted on top of the primer giving more formulation latitude. The most popular image wise application method for a primer or over-print varnish is using an inkjet equipment, just as for the image recording.

US2019/0249024A discloses an ink set comprising two different inks, a first ink containing an epoxy compound and a second ink containing an amine based polymer.

However, water soluble primary amine functionalized polymers have a considerable impact on the ink rheology and the viscoelastic properties of the liquids making them less suitable for high speed ink jet printing.

US2002/0077385 discloses an ink set comprising a first ink containing a polymer having an anionic group and a second ink having a polymer containing a cationic group to form aggregates when both inks come into contact with each other.

SUMMARY OF INVENTION

It is the objective of the present invention to the above stated problem to provide a cationic polymer particle functionalized with a high primary amine content as a solution as defined in claim 1.

It is an even further object of the present invention to provide a nanoparticle dispersion comprising cationic polymer nanoparticles as defined in claim 3.

It is an even further objective to provide a jettable liquid comprising cationic polymer nanoparticles, according to the present invention as defined in claim 4.

It is an even further objective of the present invention to provide an ink set comprising a liquid comprising cationic polymer nanoparticles, according to the present invention and at least one aqueous inkjet ink comprising a reactive compound, capable of reacting with the cationic polymer nanoparticles, as defined in claim 9.

It is another embodiment of the invention to provide an image recording method using a jettable liquid comprising cationic polymer nanoparticles as defined in claim 13.

Other features, elements, steps, characteristics and advantages of the present invention will become more apparent from the following detailed description of preferred embodi-

DESCRIPTION OF EMBODIMENTS

A. Cationic Polymer Nanoparticle with High Primary Amine Functionality

The objects of the invention are realized by a cationic polymer nanoparticle, functionalized with primary amines, characterized in that said nanoparticle comprises a resin, further called first resin, comprising at least:
- a) a repeating unit selected from the group consisting of an allyl amine and a vinyl amine; and
- b) an oxalyl amide crosslinking unit —NHCOCONH—, wherein the dashed lines represent the covalent bond to the polymer residue of said first resin; and
- c) a repeating unit according to general formula I and/or general formula II

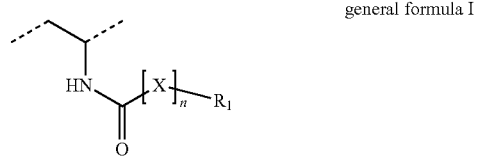

general formula I wherein
X represents O or NH
n represents 0 or 1
$R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group with the proviso that $R_1$ contains at least six carbon atoms.

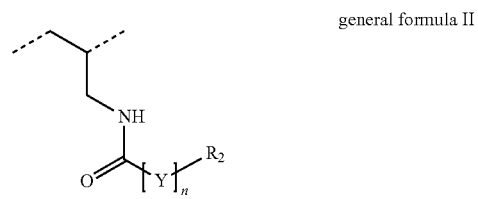

general formula II wherein
Y represents O or NH
n represents 0 or 1
$R_2$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group with the proviso that $R_2$ contains at least six carbon atoms.

In a preferred embodiment, X and Y represent NH. In another preferred embodiment, n represents 1. In an even further preferred embodiment, $R_1$ and $R_2$ are independently selected from the group consisting of a substituted or unsubstituted alkyl group, a substituted or unsubstituted alkenyl group and a substituted or unsubstituted alkenyl group, a substituted or unsubstituted alkyl group being more preferred, an unsubstituted alkyl group being the most preferred. In a further preferred embodiment, $R_1$ and $R_2$ represent an alkyl group having at least eight carbon atoms, more preferably at least ten carbon atoms and most preferably at least twelve carbon atoms.

Typical synthetic approaches for the cationic polymer nanoparticles according to the present invention are given below.

In a first embodiment, poly(allyl amine), poly(vinyl amine) or copolymers of allyl amine with other monomers or copolymers of vinyl amine with other monomers are functionalized by acylation with an activated carboxylic acid, having at least six carbon atoms, followed by emulsifying the acylated polymer in an aqueous solution and adding an oxalate based crosslinking agent. Methods for activation of a carboxylic acid are well known in the literature, including activation with typical peptide coupling reagents such as carbodiimidazole and carbodiimides, conversion of the carboxylic acid in mixed or symmetrical anhydrides and conversion of the carboxylic acid in an acyl chloride. Acyl chlorides and anhydrides are particularly preferred, acyl chlorides being the most preferred.

In a second embodiment, poly(allyl amine), poly(vinyl amine) or copolymers of allyl amine with other monomers or copolymers of vinyl amine with other monomers are functionalized by acylation with a chloroformate, a reactive carbonate or an activated alcohol, having at least six carbon atoms, followed by emulsifying the acylated polymer in an aqueous solution and adding an oxalate based crosslinking agent.

Alcohols can typically be activated by reaction with reagents according to the following formula X—CO—X, where X represents a leaving group preferably selected from the group consisting of a halogen, preferably chlorine, imidazole and N-hydroxy-succinimid. Chloroformates are particularly preferred.

In a third embodiment, poly(allyl amine), poly(vinyl amine) or copolymers of allyl amine with other monomers or copolymers of vinyl amine with other monomers are functionalized by acylation with an isocyanate or a blocked isocyanate, having at least six carbon atoms, followed by emulsifying the acylated polymer in an aqueous solution and adding an oxalate based crosslinking agent. The blocking group in said blocked isocyanate is preferably selected from the group consisting of a nitrogen containing heteroaromatic group, a ketoxime, a lactam and an aromatic alcohol. Isocyanates are particularly preferred.

Optionally, the acylated polymer, prepared according to the embodiments described above, can be dissolved in a solvent before emulsifying said polymer in an aqueous solution. The solvent is preferably a solvent having a boiling point lower than 100° C. Typical solvents can be selected from ketones, esters and ethers, such as acetone, methylethylketone, tetrahydrofurane and ethyl acetate. After emulsification the solvent is removed before or after adding the oxalate crosslinking agent.

During emulsification, a dispersing agent or a surfactant can be used. Preferably an emulsifying surfactant used. Said surfactant is preferably a cationic surfactant and most preferably a cationic surfactant capable of reacting with said oxalate crosslinking agent.

Oxalate crosslinking agents are compounds according to general formula III

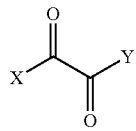

general formula III wherein
- X and Y are independently selected from the group consisting of a halogen, a nitrogen containing heteroaromatic residue coupled to the oxalate moiety via a nitrogen, an aliphatic or aromatic alcohol residue, a lactam, an aromatic, aliphatic or heteroaromatic thiol residue and an N-hydroxy-imid residue.

In a preferred embodiment, X and Y are the same and more preferably represent an aliphatic alcohol residue. In the most preferred embodiment, said oxalate crosslinker is an oxalate ester of a $C_1$ to $C_6$ alcohol, ethyl and methyl oxalate being particularly preferred.

B. Aqueous Dispersion of the Cationic Polymer Nanoparticle

Aqueous dispersions of the cationic polymer nanoparticle according to the invention can be made by any suitable dispersion technique. Preferably, a dispersant, being a polymer or a surfactant, more preferably a cationic polymeric dispersant or cationic surfactant is added before, during or after the addition of the crosslinking agent. Suitable cationic surfactants are described in WO2018138054 and WO2018137993. After mixing at high speed or applying high shear forces onto the mixture and evaporation of the organic solvents, an aqueous dispersion of the cationic polymer nanoparticles is obtained.

C. Jettable Aqueous Liquid for Inkjet Printing

The dispersion of the cationic polymer nanoparticles can be used in jettable aqueous liquids for inkjet printing such as a pre-treatment liquid, an aqueous inkjet ink or an over-print varnish.

The obtained aqueous liquid according to the present invention may contain the cationic polymer nanoparticle in an amount of 1 wt. % to 30 wt. %, more preferably in an amount of 5 wt. % to 25 wt. % and most preferably in an amount of 10 wt. % to 20 wt. %. The average particle diameter of the cationic polymer nanoparticle may be from about 10 nm to about 1 μm. Preferably, the average particle diameter may be from about 10 nm to about 500 nm. More preferably, the average particle diameter may be from about 50 nm to about 250 nm. Still more preferably, the average particle diameter may be from about 160 nm to about 220 nm. To avoid jetting reliability problems, the average particle diameter of the cationic polymer nanoparticles should be below 1 μm.

The aqueous liquid can be applied onto the substrate or onto the printed images by means of a coating technique, a spraying technique or a jetting technique. Preferable jetting techniques are inkjet and valve jet. The aqueous liquid becomes then a jettable aqueous liquid.

C.1. Water Soluble Organic Solvent

The jettable aqueous liquid, comprising the cationic polymer nanoparticle according to the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, 1,2-pentanediol, 2,4-pentanediol, 1,5-pentanediol, 1,6-hexanediol, 2-ethyl-1, 3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous liquid is preferably less than 70 wt. %. If the content exceeds 70% by mass, the liquid loses its water based, hence more green character. The amount of water-soluble organic solvent is preferably between 1 and 40 wt. %, more preferably between 5 and 40 wt. %.

The water-soluble organic solvent is added to the aqueous liquid comprising the cationic polymer nanoparticles to prevent fast drying of the liquid at the nozzles of the inkjet head and further helps in dissolving additional compounds in the liquid.

C.2. Surfactant

In the jettable aqueous liquid of the present invention, a surfactant may be added in order to ensure wettability onto the substrate, if used as a primer or onto the printed images if used as an over-print varnish. The amount of the surfactant added is preferably 0.1 wt. % to 5 wt. % as an active component in the liquid.

If the amount added is below 0.1% by mass, wettability onto the substrate or printed images is not sufficient and causes degradation in image quality and in adhesion to the substrate. The surfactant that can be used is not particularly limited as long as it satisfies the above limitation.

The surfactant is preferably an amphoteric surfactant, a non-ionic or cationic surfactant because interaction with the cationic resin particles are reduced with respect to an anionic surfactant. Examples of non-ionic surfactants are polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable non-ionic surfactants are preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1010, or from Nissin Chemical Industry as Surfynol (registered trademark) 465 and Surfynol 61.

Other suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

Examples of cationic surfactants include tetraalkylammonium salts, alkylamine salts, benzalkonium salts, alkylpyridium salts and imidazolium salts, such as dihydoxyethylstearylamine, 2-heptadecenylhydroxyethylimidazoline, lauryldimethylbenzylammonium chloride, cetylpyridinium chloride and stearamidemethylpyridium chloride.

C.3. Additives

Together with the cationic polymer nanoparticles of the present invention, a multivalent metal ion or second cationic polymer can be contained in the aqueous liquid, especially when the liquid is a pre-treatment liquid or fixer liquid and is coated or printed onto a substrate prior to the jetting of the colored aqueous inkjet ink. The multivalent metal ion or second cationic polymer is able to cause aggregation of the colorants in the aqueous inkjet ink when jetted onto the primer. These polyvalent metal ions or cationic polymers have a function of aggregating ink by acting on anionic groups such as the carboxyl groups on the surface of the pigment or the dispersed polymer contained in the ink. As a result, the ink remains immobilized on the surface of the substrate to improve the colour-developing property. Therefore, it is preferred that the surface of the pigment in the ink and/or the dispersed polymer of the capsules contained in the ink have an anionic group selected from the group of carboxyl group, sulfonate group and phosphonate group, most preferably carboxyl group.

Suitable examples of water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

Suitable examples of cationic polymers include polyamines, quaternized polyamines and polyguanidines. Other cationic polymers include poly(N, N, -dimethyl-2-hydroxypropylene ammonium chloride), poly(4-vinyl-1-methyl-pyridinium bromide), polydiallydimethylammoniumchloride, copolymers of quaternized vinylimidazole and polyquaternium. Examples of polyamines that can be preferably employed in the primer of the invention of this include polyethyleneimine, polyvinylpyridine, polyvinylamine, polyallylamine, and combinations thereof.

The aqueous liquid may also contain colorants, such as pigments. If the jettable aqueous liquid is to act as an aqueous inkjet ink, the liquid may contain a colorant such as a dye, disperse dye or pigment. Preferably the colorant is a pigment because pigments lead to images with a higher resistance against light fading. In order to obtain stable aqueous inkjet inks comprising the cationic polymer nanoparticles of the present invention, the colorant should preferably also have a cationic charge. More preferably, the pigments are to be dispersed with cationic dispersing agents such as cationic surfactants or cationic polymers. Examples of suitable dispersing agents are disclosed in WO2018138054 and WO2018137993. Both references are incorporated by reference. Suitable pigments to be incorporated in the jettable liquid of the present invention are described in § D.3.

Particularly useful for printing on colored substrates such as dark textile, brown corrugated cardboard or colored leather is a pre-treatment liquid containing a white pigment. The preferred pigment for the aqueous pre-treatment liquid is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TiO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic polymer nanoparticles of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

If the aqueous liquid is an over-print varnish or post-treatment liquid which is applied onto the printed image, the liquid may include a latex. The latex may be present in the liquid of at least 10 weight percent to about 30 weight percent and further increase the resistance of the printed image against mechanical impact (abrasion, scratching) and chemical attack by means of organic solvents or water. In one example, the latex may be selected from a group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, polyurethanes and mixtures thereof. Preferably, the latex has a cationic charge in order to be compatible with the cationic organic resin particles of the invention.

The liquid may also contain humectants. Humectants are preferably incorporated if the aqueous jettable liquid has to be applied by means of a jetting technique such as inkjet or valve jet. Humectants prevent the clogging of nozzles. The prevention is due to its ability to slow down the evaporation rate of the jettable aqueous liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

D. Aqueous Inkjet Ink.

In order to achieve the advantages of the present invention, the aqueous liquid comprising the cationic polymer nanoparticles, must be combined during the image formation with an aqueous inkjet ink comprising a reactive compound capable of reacting with the first resin of the cationic polymer nanoparticle. An ink set according to the invention is hence obtained.

D.1. Reactive Compound Capable of Reacting with the First Resin of the Cationic Polymer Nanoparticle.

The aqueous inkjet ink making part of the ink set of the invention, comprises a reactive compound capable of reacting with the first resin of the cationic polymer nanoparticle, more preferably the reactive compound is a second resin capable of reacting with the primary amine functional group of the cationic polymer particle of the invention. Preferably the reaction between the second resin and the primary amine functional group takes place at elevated temperature with respect to room temperature, hence preferably above 60° C., more preferably above 80° C. If the temperature is below 60° C., the reaction is incomplete or does not take place, hence no improvement of solvent resistance of the printed images is observed.

Preferably, the second resin is selected from the group consisting of epoxy based resins, β-keto-ester based resins and polymers functionalized with activated double bonds such as oligofunctional maleimides and acrylates.

Examples of the epoxy based resins may include polyethylene glycol di glycidyl ether, diglycerol polyglycidyl ether and sorbitol polygycidyl ether. More specific examples may include Dinacol EX-821, Dinacol EX-841, Dinacol EX-421, Dinacol EX-614B (all supplied by Nagase ChemteX corporation).

Examples of β-keto-ester based resins and analogous resins are resins having at least 3 repeating units comprising a functional group according to general formula IV, V or VI

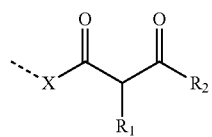

general formula IV

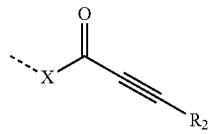

general formula V

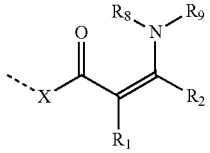

general formula VI wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, C(=O)$R_3$ and CN $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and C(=O)$R_3$ $R_1$ and $R_2$ may represent the necessary atoms to form a five to eight membered ring $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, O$R_4$ and N$R_5R_6$ $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ may represent the necessary atoms to form a five to eight membered ring X is selected from the group consisting of O and N$R_7$ $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ may represent the necessary atoms to form a five to eight membered ring.

In a preferred embodiment said oligomer or polymer comprising repeating units functionalized with a moiety according to general formula IV, comprise at least 7 functionalized, more preferably at least 10 and most preferably at least 15 functionalized repeating units.

In a further preferred embodiment, X represents an oxygen. In an even further preferred embodiment, $R_1$ represents a hydrogen. In an even further preferred embodiment $R_2$ represent a substituted or unsubstituted alkyl group, unsubstituted being more preferred, a lower alkyl group being even more preferred and a methyl group being the most preferred.

The oligomer or polymer according to the present invention preferably has a weight average molecular weight of at least 2000, more preferably 4000 and most preferably between 6000 and 30000.

The polymer according to the present invention can be a homopolymer or a copolymer of different repeating units.

Oligomers or polymers according to the present invention can be prepared by addition polymerization of ethylenically unsaturated monomers, polycondensation and ring opening polymerization, addition polymerization being particularly preferred. In the most preferred embodiment, free radical polymerization of ethylenically unsaturated monomers is used to prepare the resins according to the present invention. In another embodiment of the present invention, the molecular weight of the resins according to the present invention is controlled using RAFT agents, ATRP, nitroxyl radical technology or transfer agents, preferably thiols.

Typical monomers for the preparation of resins according to the present invention are given in Table 1, 2 and 3 of the unpublished patent application EP19217051.2 which is hereby incorporated by reference.

Preferably, the β-keto-ester based resins and analogous resins having at least 3 repeating units comprising a functional group according to general formula IV, V or VI, are encapsulated by polymerization, more preferably by using interfacial polymerization.

Encapsulation increases the storage stability of the aqueous inkjet due to the formation of a polymeric barrier, i.e. the polymeric shell of the capsule, between the oligomer or polymer and the other compounds in the aqueous inkjet ink. More particularly, partial hydrolysis of the functional group according to general formula I upon storage of the aqueous inkjet ink is prevented. The reactivity and hence the obtained improvements towards solvent and water resistance of the printed images does hence not decrease upon storage of the inkjet ink.

It has also been observed that the encapsulation of the oligomer or polymer having at least 3 repeating units comprising the functional group according to general formula I, II or III results in a more reliable jetting behaviour of the inkjet ink comprising the resin than without encapsulation.

The capsules are preferably present in the aqueous inkjet ink, in amount of no more than 45 wt. %, preferably between 5 and 25 wt. % based on the total weight of the ink. It was observed that above 30 wt. % jetting was not always so reliable.

The capsules to be used in the inkjet ink, have an average particle size of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

The capsules are dispersed in the aqueous medium of the inkjet ink using a dispersing group covalently bonded to the polymeric shell or are dispersed by using dispersants or surfactants preferably added during or after the formation of the capsule. The dispersing group covalently bonded to the polymeric shell is preferably selected from the group consisting of a carboxylic acid or salt thereof, a sulfonic acid or salt thereof, a phosphoric acid ester or salt thereof.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

There is no real limitation on the type of polymer used for the polymeric shell of the capsule. Preferably, the polymer used in the polymeric shell is cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

The oligomer or polymer having at least 3 repeating units comprising a functional group according to general formula IV, V or VI with a polymeric shell, can be encapsulated using both chemical and physical methods.

Suitable encapsulation methodologies include complex coacervation, liposome formation, spray drying and polymerization methods.

In the present invention preferably a polymerization method is used, as it allows the highest control in designing the capsules. More preferably interfacial polymerization is used to prepare the capsules of the invention.

This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules making part of the inkjet ink according to the invention are preferably prepared from an oleophilic dispersion in an aqueous continuous phase.

Typical polymeric shells of the capsules and formed by interfacial polymerisation are selected from the group consisting of polyamides, typically prepared from di- or poly-acid chlorides as first shell component and di- or oligo-amines as second shell component, polyurea, typically prepared from di- or oligo-isocyanates as first shell component and di- or oligo-amines as second shell component, polyurethanes, typically prepared from di- or oligo-isocyanates as first shell component and di- or oligo-alcohols as second shell component, polysulfonamides, typically prepared from di- or oligo-sulfochlorides as first shell component and di- or oligo-amines as second shell component, polyesters, typically prepared from di- or oligo-acid chlorides as first shell component and di- or oligo-alcohols as second shell component and polycarbonates, typically prepared from di- or oligo-chloroformates as first shell component and di- or oligo-alcohols as second shell component. The shell can be composed of combinations of these polymers.

In a further embodiment, polymers, such as gelatine, chitosan, albumin and polyethylene imine can be used as second shell components in combination with a di- or oligo-isocyanate, a di- or oligo acid chloride, a di- or oligo-chloroformate and an epoxy resin as first shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains the oligomer or polymer having at least 3 repeating units comprising a functional group according to general formula IV, V or VI. These are usually incorporated into the capsules by dissolving it in the organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when the oligomer or polymer, having at least 3 repeating units comprising a functional group according to general formula IV, V or VI have a viscosity of less than 100 mPa·s.

The method for preparing a dispersion of capsules preferably includes the following steps:

a) preparing a non-aqueous solution of a first shell component for forming the polymeric shell and the oligomer or polymer, having at least 3 repeating units comprising a functional group according to general formula IV, V or VI in an organic solvent having a low miscibility with water and having a lower boiling point than water;

b) preparing an aqueous solution of a second shell component for forming the polymeric shell;

c) dispersing the non-aqueous solution under high shear in the aqueous solution;

d) optionally stripping the organic solvent from the mixture of the aqueous solution and the non-aqueous solution; and e) preparing a polymeric shell around the oligomer or polymer, having at least 3 repeating units comprising a functional group according to general formula IV, V or VI by interfacial polymerization of the first and second shell component for forming the polymeric shell.

The capsule dispersion can then be completed into the inkjet ink by addition of e.g. water, humectants, surfactant and the like.

In a preferred embodiment, the capsules are self-dispersing capsules. In order to make capsules self-dispersing, anionic dispersing groups, such as carboxylic acids or salts thereof, sulfonic acids or salts thereof, phosphoric acid esters or a salts thereof or a phosphonic acids or salts thereof, may be covalently bonded to the polymeric shell of the capsule to guarantee the dispersion stability.

A preferred strategy to incorporate anionic stabilizing groups into the polymeric shell of a capsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on capsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomer or polymer, having at least 3 repeating units comprising a functional group according to general formula IV, V or VI.

In another embodiment of the present invention, said second resin capable of reacting with the primary amine functional group, is functionalized with Michael acceptors. In a preferred embodiment, said Michael acceptor is selected from the group consisting of an acrylate, a methacrylate, an acrylamide, a methacrylamide, a maleimide and a vinyl sulfone, an acrylate, a methacrylate and a maleimide being more preferred, an acrylate and a maleimide being the most preferred.

Particularly preferred acrylate functionalized resins are prepared by polycondensation or ringopening polymersiation. Polyurethanes and polyesters are particularly preferred acrylated resins typically prepared by polycondensation, preferably using hydroxyl functionalized acrylates in the polycondensation reactions, respectively with difunctional isocyanates and acid chlorides.

Acrylated polyurethanes are most preferred and well known in the art of coatings, such as wood coatings ((Wade et al., JCT CoatingTech, 2(14), 42-46 (2005)), furniture coatings (Irle et al., RadTech Europe 05, conference proceedings, 1, 375-380 (2005) and pigmented coatings (Tielemans et al., Polymer Paint Colour Journal, 199, 4538, 31-33 (2009)). The technology has recently been reviewed by Tennebroek et al. (Polym. Int., 68, 832-842 (2019)).

Maleimide functionalized resins can be prepared by polycondensation as disclosed in WO2016113760 (Council of scientific and industrial research). Addition polymerisation for the preparation of maleimide functionalized resins has been disclosed by Grawe and Bufkin (Jornal of Coating Technology, 53 (676), 45-55 (1981)). Strategies using protected maleimides and polymer post derivatisation in the preparation of maleimide functionalized resins have been disclosed by Hall et al. (Polym. Int. 60, 1149-1157 (2011)).

The Michael acceptor functionalized resins can be water soluble or water dispersible, water dispersible being more preferred, acrylate functionalized polyurethane latexes being the most preferred.

D.2. Solvent

The aqueous medium of the ink making part of the ink set according to the invention contains water, but may preferably include one or more water-soluble organic solvents. These solvents are added to prevent the fast drying of the aqueous inkjet ink at the nozzle of the inkjet head, help dissolving certain compound in the aqueous inkjet ink and help penetration of the ink in porous substrates. Suitable solvents which can be incorporated in the inks are preferably polyols (e.g., ethylene glycol, glycerin, 2-ethyl-2-(hydroxymethyl)-1, 3-propanediol, tetraethylene glycol, triethylene glycol, tripropylene glycol, 1,2,4-butanetriol, diethylene glycol, propylene glycol, dipropylene glycol, butyleneglycol, 1, 6-hexanediol, 1, 2-hexanediol, 1, 5-pentanediol, 1,2-pentanediol, 2,2-dimethyl-1, 3-prapanediol, 2-methyl-2,4-pentanediol, 3-methyl-1, 5-pentanediol, 3-methyl-1, 3-butanediol, and 2-methyl-1, 3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

D.3. Pigments

The aqueous ink making part of the ink set according to the invention comprises a colorant. The colorant may be a water-soluble dye, a disperse dye. Preferably the colorant is a pigment which can be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic surfactants may be preferably used as dispersant for the pigment. The latter prevents interaction of the polymeric dispersant with the dispersing groups of capsules which may be included in the inkjet ink, since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The ink is diluted with water to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is the same as described in § A.1.4.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:
  statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and
  mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p.110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

E. Method of Image Recording

An embodiment of the inkjet image recording method according to the invention is the use of the ink set according to the invention. The ink set comprises a jettable aqueous liquid comprising the cationic polymer nanoparticle according to the invention and an aqueous inkjet comprising a reactive compound capable of reacting with the first resin of the cationic polymer particle, preferably the compound is a second resin selected from the group consisting of epoxy based resins, β-keto-ester based resins and polymers functionalized with activated double bonds such as oligofunctional maleimides and acrylates. The method comprises the steps of: a) applying on a substrate, the ink set of the present invention to form an image, preferably by a jetting technique; and b) drying the applied ink set by applying heat such that the temperature of the formed image is of at least 60° C., more preferably at least 80° C.

In another embodiment of the inkjet recording method of the invention using the ink set of the invention, the method comprises following steps: a) applying the aqueous liquid comprising the cationic polymer nanoparticle onto a substrate. The application is preferably done by a jetting technique such as inkjet, valve jet or spraying and; b) optionally at least partially dry the applied aqueous liquid and; c) jetting the aqueous inkjet ink to form an image, the ink comprises a colorant and a reactive compound capable of reacting with the primary amine functional group of the resin of the cationic polymer nanoparticle onto the applied aqueous liquid. More preferably, the reactive compound is a second resin selected from the group consisting of epoxy based resins, β-keto-ester based resins and polymers functionalized with activated double bonds such as oligofunctional maleimides and acrylates and; d) drying the jetted inkjet by applying heat such that the temperature of the formed image is of at least 60° C., more preferably at least 80° C.

In another embodiment of the inkjet recording method using the ink set according to the invention, the method comprises the steps of: a) jetting an aqueous inkjet ink on a substrate to form an image, the ink comprising a colorant and a compound capable of reacting with the primary amine of the resin of the cationic polymer nanoparticle. The substrate may have been treated with a fixer or primer liquid comprising a component capable of aggregating components in the aqueous inkjet ink of the ink set. Examples of such compounds are a flocculant or a cationic compound. The substrate may have been treated with the aqueous liquid comprising the cationic polymer nanoparticle of the invention. More preferably, the reactive compound is a second resin selected from the group consisting of epoxy based resins, β-keto-ester based resins and polymers functionalized with activated double bonds such as oligofunctional maleimides and acrylates and; b) optionally at least partially dry the jetted aqueous inkjet ink and; c) applying the aqueous liquid comprising the cationic polymer nanoparticle of the present invention. The application is preferably done by a jetting technique such as inkjet, valve jet or spraying and; d) drying the applied ink set by applying heat such that the temperature of the formed image is of at least 60° C., more preferably at least 80° C.

In another embodiment of the inkjet recording method, the method comprises the steps of: a) jetting an ink set comprising the jettable liquid, being an ink comprising a colorant and the cationic polymer nanoparticle of the invention and an aqueous inkjet ink comprising a colorant and a reactive compound capable of reacting with the primary amine of the resin of the cationic polymer nanoparticle on a substrate to form an image. b) drying the applied ink set by applying heat such that the temperature of the formed image is of at least 60° C., more preferably at least 80° C. The jetting of both inks in step a) can be done sequentially or simultaneously.

The substrate in the inkjet recording method may be porous, such as e.g. textile, paper, leather and card board substrates, but is preferably a non-absorbing substrate such as polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

The aqueous liquid comprising the cationic polymer nanoparticle is preferably applied via a technique selected from the group of ink jetting, valve jetting and spraying. More specifically, these techniques of ink jetting and valve jetting allow, the aqueous liquid according to the invention to be applied image wise, preferably onto the surfaces of the substrate whereupon the inkjet ink will be printed to obtain an image. This process is also called under-printing. This has the advantages that the amount of required aqueous liquid is substantially lower than with other application methods of priming the substrate, that less aqueous liquid has to be dried and that the layer of dried primer may be less robust against interaction with chemicals and mechanical impact than the layer obtained by applying the inkjet ink.

Examples of the heating process to dry the applied ink set according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources. More specifically, examples of heat sources include equipment for forced-air heating, radiation heating such as IR-radiation, including NIR- and CIR radiation, conduction heating, high-frequency drying, and microwave drying. The drying step is such that a temperature is preferably obtained below 150° C., more preferably below 100° C.

A preferred ink jet head for the inkjet printing system to jet the ink set of the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the ink set according to the present invention is not restricted to piezoelectric inkjet printing. Other inkjet print heads can be used and include various types, such as a continuous type, a thermal print head type, a MEM-jet type head and a valve jet type.

EXAMPLES

Materials

All compounds are supplied by TCI Europe unless otherwise specified.

Desmodur N75 BA is a trifunctional isocyanate supplied by Bayer AG.

Lakeland ACP70 is a zwitterionic surfactant supplied by Lakeland Laboratories LTD.

Surfinol 104H is a surfactant supplied by Nissin Chemical Industry

CATSURF-1, cationic surfactant synthesized as follows: 29 g (3-acrylamidopropyl)trimethylammonium chloride (supplied as 75 wt. % in water) was dissolved in 150 g isopropanol. 26.9 g octadecyl amine and 15 g triethyl amine were added and the mixture was heated to 80° C. for 24 hours. The solvent was removed under reduced pressure Alkanol XC is an anionic surfactant supplied by Dupont.
Cab-o-Jet 465M is a magenta pigment dispersion supplied by Cabot
Cab-O-Jet 450C is a cyan pigment dispersion supplied by Cabot
MNDA is methyldiethanol amine, supplied by Aldrich
Sub-1: poly(propylene) (Priplak), supplied by Antalis
Sub-2: Synaps (SUV311) provide by Agfa-Gevaert NV
Sub-3: polycarbonate (Lexan PC 9030 Clear), supplied by Lexan
Sub-4: floated glass (Sn-contact side), supplied by Danny Lauryssens Glas, manufactured by Lerobel
Sub-5: Stainless steel R316L supplied by Dejond (Wilrijk, Belgium)
Sub-6: PVC (MD5-100), supplied by Metamark
Sub-7: roughened and anodized lithographic aluminium printing plate substrate

Example 1

This example illustrates the increase in solvent resistance by using an ink set, comprising an aqueous ink comprising a β-keto-ester based resin, and an aqueous liquid acting as an over-print varnish and comprising the cationic polymer nanoparticle of the present invention.

The Synthesis of Inventive Second Resin INVRES-1:

10 g of 2-(acetoacetoxy)ethyl methacrylate was dissolved in 30 ml ethyl acetate. 0.472 g of dodecyl mercaptane was added and the mixture was purged with nitrogen. 134 mg of 2,2'-azobis[2-methylbutyronitrile]was added and the mixture was refluxed for 6 hours. The mixture was allowed to cool down to room temperature. The solution of inventive resin INVRES-1 in ethylacetate was directly used in the synthesis of the capsule INVCAP-1. The molecular weight of INVRES-1 was determined, using GPC relative to poly (styrene) standards. INVRES-1 had a numeric average molecular weight Mn of 10500 and a weight average molecular weight Mw of 15400.

The Preparation of the Capsule Comprising a β-Keto-Ester Based Resin INVCAP-1:

13.2 g of Desmodur N75 BA was added to 37 g of the above described solution of INVRES-1 in ethyl acetate. 1.2 g of Lakeland ACP 70 was added and the solution was stirred for an hour at room temperature. This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter. Average particle sizes of all capsule dispersions were measured using a Zetasizer™ Nano-S (Malvern Instruments, Goffin Meyvis). The average particle size of INVCAP-1 was 183 nm.

Inventive Aqueous Inkjet Ink INV-1

Inventive ink INV-1 was prepared by mixing the components according to Table 1. All weight percentages are based on the total weight of the ink jet ink.

TABLE 1

| Weight % of | INV-1 |
|---|---|
| INVCAP-1 | 38 |
| Cab-O-Jet 465M | 22 |
| Surfinol 104H | 2 |
| Dowanol DPM | 19 |
| Ethylene glycol | 19 |

The Aqueous Liquid Comprising the Cationic Polymer Particle Dispersion of the Present Invention: AMINE-1

The cationic polymer particle dispersion, being a dispersion of an organic resin particle comprising a first resin having at least one repeating unit selected from the group consisting of a vinyl amine and an allyl amine, an oxalyl amide crosslinking moiety and a least one functional group selected from the group consisting of vinyl amine and allyl amine further comprising at least on repeating unit according to general formula I or general formula II was prepared as follows:

A solution of 7 g octadecyl isocyanate in 40 g acetone was added over 3 minutes at room temperature to a mixture of 50 g of a 20 wt. % poly(allylamine) (Mw: 60000) in water and 200 g acetone. The mixture was stirred for 3 minutes using an Ultra Turrax at 15000 RPM. The mixture was refluxed for 20 minutes. The mixture was allowed to cool down to room temperature and stirred for 3 minutes using an Ultra Turrax at 15000 RPM.

A solution of 2 g ethyl oxalate in 20 g acetone was mixed with a solution of CATSURF-1 in 4 g methanol. This mixture was stirred for 10 minutes at room temperature and added over 3 minutes to the polymer solution described above, followed by stirring with an Ultra Turrax at 15000 RPM. The mixture was stirred for 30 minutes at room temperature. 50 g water was added. The solvent and water was evaporated under reduced pressure to adjust the weight of the dispersion to 80 g. 0.3 of Proxel K was added as biocide.

The average particle size was measured using a Zetasizer™ Nano-S (Malvern Instruments, Goffin Meyvis). The average particle size was 71 nm.

Comparative Ink INKCOMP-1

State of the art poly(urethane) based inks have been disclosed in WO2018077624A. Based on WO2018077624, comparative ink COMP-1 has been formulated by mixing the components according to Table 2. All weight percentages are based on the total weight of the ink jet ink.

TABLE 2

| Weight % of | COMP-1 |
|---|---|
| PU-1 | 28.5 |
| Cab-O-Jet 450C | 20 |
| Tego Wet 270 | 0.6 |
| 2-pyrrolidone | 20 |
| 1,2-hexane diol | 20 |
| water | 10.9 |

PU-1 has been prepared as PU-9, disclosed in WO2018077624.

Adhesion and Chemical Resistance Test of Image Formed by Means of the Inventive Ink Set The inventive ink INV1 and the comparative ink COMP-1 were coated on a series of substrates, using a 4 micron wired bar, and dried for 15 minutes at 80° C.

The inventive examples were over coated with the cationic polymer nanoparticle containing aqueous liquid AMINE-1, using a 4 micron wired bar, and dried for 15 minutes at 80° C. Hence, AMINE-1 functions as an overprint varnish. The adhesion of each sample was evaluated by a cross-cut test according to IS02409:1992(E). Paints (International standard 1992-08-15) using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with the criteria described in Table 3, where both the adhesion in the cross-cut and outside the cross-cut were evaluated.

TABLE 3

| Evaluation value | Criterion |
|---|---|
| 0 | Nothing removed, perfect adhesion. |
| 1 | Detachment of only very small parts of the cured layer, almost perfect adhesion |
| 2 | Minor parts of the cured layer was removed by the tape, good adhesion |
| 3 | Parts of the cured layer were removed by the tape, poor adhesion |
| 4 | Most of the cured layer was removed by the tape, poor adhesion |
| 5 | The cured layer was completely removed from the substrate by the tape, no adhesion |

The water resistance and solvent resistance was evaluated by wiping 40 times with a Q-tip over the coatings using water, isopropanol and methyl ethyl ketone respectively. The results are summarized in Table 4.

A score of 0 means very severe damage when wiping with a Q-tip, while a score of 2 means hardly or no damage upon wiping. A score of 1 means visible damage upon wiping.

TABLE 4

| | Inventive | | | | Comparative | | | |
|---|---|---|---|---|---|---|---|---|
| | Adhesion | MEK | IPA | Water | Adhesion | MEK | IPA | Water |
| Sub-1 | 0 | 2 | 2 | 2 | 5 | 0 | 0 | 0 |
| Sub-2 | 0 | 2 | 2 | 2 | 0 | 0 | 1 | 2 |
| Sub-3 | 0 | 2 | 2 | 2 | 0 | 0 | 1 | 2 |
| Sub-4 | 0 | 2 | 2 | 0 | 5 | 0 | 1 | 0 |
| Sub-5 | 0 | 1 | 1 | 1 | 0 | 0 | 1 | 2 |
| Sub-6 | 2 | 1 | 1 | 1 | 0 | 0 | 0 | 2 |
| Sub-7 | 0 | 1 | 1 | 0 | 5 | 0 | 1 | 0 |

From Table 4, it becomes apparent that the crosslinking approach by using the ink set according to the present invention gives considerably more latitude in chemical resistance on different substrates, while maintaining excellent adhesion performance, in comparison with a poly(urethane) based resin ink.

The invention claimed is:

1. An organic resin particle comprising a first resin having at least: (i) a repeating unit selected from the group consisting of a vinyl amine and an allyl amine; (ii) an oxalyl amide crosslinking unit —NHCOCONH—, wherein the dashed lines represent the covalent bond to the polymer residue of the first resin; and (iii) a repeating unit according to Formula I or Formula II:

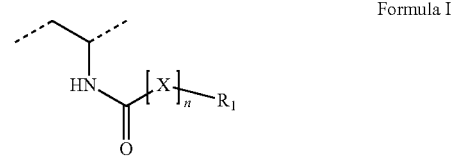

Formula I wherein
X represents O or NH;
n represents 0 or 1; and
$R_1$ is selected from the group consisting of an alkyl group, an alkenyl group, an alkynyl group, an aralkyl group, an alkaryl group, and an aryl or heteroaryl group, with the proviso that $R_1$ contains at least six carbon atoms, or

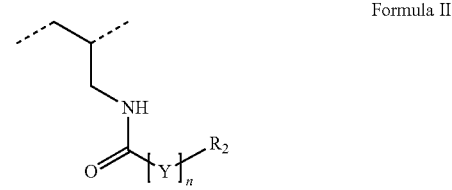

Formula II wherein
Y represents O or NH;
n represents 0 or 1; and
$R_2$ is selected from the group consisting of an alkyl group, an alkenyl group, an alkynyl group, an aralkyl group, an alkaryl group, and an aryl or heteroaryl group, with the proviso that $R_2$ contains at least six carbon atoms.

2. The organic resin particle of claim 1, wherein X and Y represent NH, n represents 1, and $R_1$ and $R_2$ represent an alkyl group having at least eight carbon atoms.

3. An aqueous dispersion comprising the organic resin particle as defined in claim 1.

4. An aqueous dispersion comprising the organic resin particle as defined in claim 2.

5. A jettable aqueous liquid for inkjet printing comprising a water-soluble organic solvent and the organic resin particles as defined in claim 1.

6. The jettable aqueous liquid of claim 5, further comprising a component capable of aggregating components in an aqueous inkjet ink which comprises a colorant.

7. The jettable aqueous liquid of claim 5, further comprising a colorant.

8. The jettable aqueous liquid of claim 6, further comprising a colorant.

9. The jettable aqueous liquid of claim 7, wherein the colorant is a white pigment.

10. The jettable aqueous liquid of claim 8, wherein the colorant is a white pigment.

11. The jettable aqueous liquid of claim 5, further comprising a latex selected from the group consisting of polyacrylates and polyurethanes.

12. The jettable aqueous liquid of claim 6, further comprising a latex selected from the group consisting of polyacrylates and polyurethanes.

13. The jettable aqueous liquid of claim 9, further comprising a latex selected from the group consisting of polyacrylates and polyurethanes.

14. An ink set for inkjet printing comprising the jettable aqueous liquid as defined in claim 6 and an aqueous inkjet ink comprising a reactive compound capable of reacting with the first resin, a water-soluble organic solvent, and a colorant.

15. An ink set for inkjet printing comprising the jettable aqueous liquid as defined in claim 9 and an aqueous inkjet ink comprising a reactive compound capable of reacting with the first resin, a water-soluble organic solvent, and a colorant.

16. The ink set of claim 14, wherein the reactive compound is a second resin selected from the group consisting of epoxy based resins, β-keto-ester based resins, and polymers functionalized with oligofunctional maleimides or acrylates.

17. The ink set of claim 16, wherein the β-keto-ester based resin is encapsulated by means of a polymeric shell.

18. The ink set of claim 17, wherein the polymeric shell comprises a dispersing group covalently bonded to the polymeric shell and is selected from the group consisting of a carboxylic acid or salt thereof, a sulfonic acid or salt thereof, and a phosphoric acid ester or salt thereof.

19. A method of image recording, comprising the following steps:
   i) jetting the ink set as defined in claim 18 onto a substrate to form an image; and
   ii) drying the applied ink set by means of heat to obtain a temperature of the image of at least 60° C.

20. The method of claim 19, wherein the ink set is applied by means of a jetting technique such as inkjet, valve jet, or spraying.

\* \* \* \* \*